3,232,788
SURFACE TREATMENT OF ATTENUATED GLASS
Alfred Marzocchi, Cumberland, R.I., and John A. Waugh, Huntingdon, Pa., assignors to Owens-Corning Fiberglas Corporation, Toledo, Ohio, a corporation of Delaware
Filed June 21, 1961, Ser. No. 118,727
5 Claims. (Cl. 117—126)

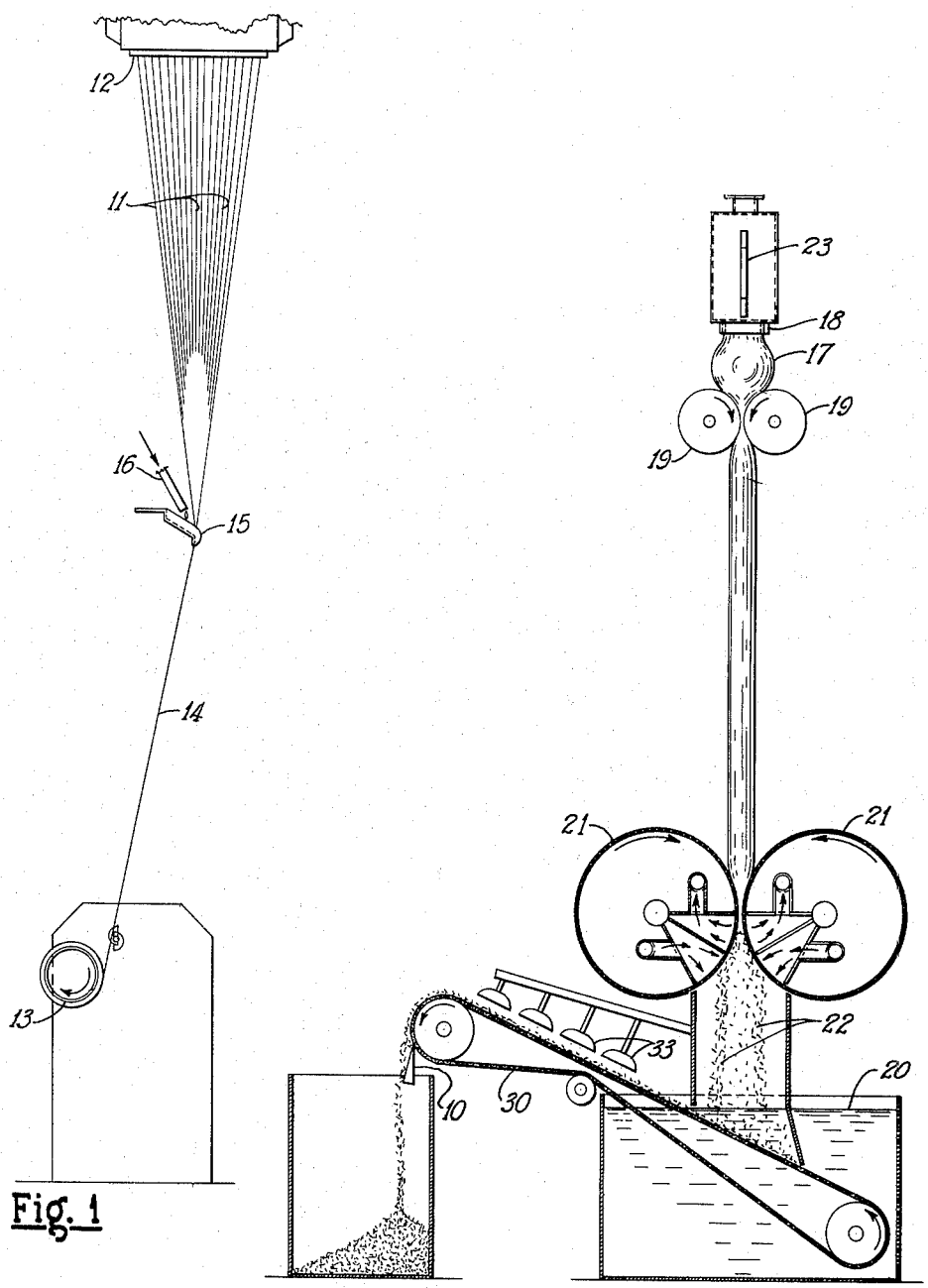

This application is a continuation-in-part of Serial No. 851,330, filed November 6, 1959.

This invention relates to the improvement of silicate material surfaces and especially to the treatment of such surfaces to retain the excellent inherent properties of the materials as found in nature or as formed.

Many attempts to improve glass surfaces or to protect glass surfaces have been made in the past. For instance, glass bottles have been treated with various wetting agents, lubricants, and other chemical compounds to extend their useful life by reducing scratching or other damage during use. Many size compositions comprising film formers, lubricants, resin coupling agents, wetting agents and the like have been developed for treating textile glass fibers; and various coatings and binders are used with glass fiber packs, mats, and bats. Wax, asphalt, phenolic resins, and various other materials have been used as binders and as coatings for glass fibers. Likewise it is known that glass can be colored by treating with solutions of a salt, the ions of which will be absorbed by base exchange or a substitution of basic constituents of the glass by metallic ions of the solution.

Although natural occurring silicate materials have excellent physical properties, they likewise can be improved by proper treatment of the surfaces.

Most treatments have used organic materials whether they be starch, resin, wax, rosin, or whether they be natural occurring or man-made materials. Although many treatments have been devised, there still remains a great need for improved forms of glass and other silicate materials such as mica, quartz and the like.

It is an object of this invention to provide improved treatments for silicate materials.

It is a further object to provide an inorganic treatment for silicate surfaces.

It is also an object to provide apparatus and process for applying such treatments to glass surfaces or other silicate surfaces as the surfaces are being formed.

It has been discovered that silicate surfaces are greatly improved by application of ionic materials to the silicate surfaces. Large cations or anions adsorbed upon the surface of the silicate material provide improved physical properties. Such improvement in physical properties is even more pronounced in forms of silicate materials wherein the ratio of surface area to total mass is high. For instance, flakes, sheets, fibers and other particulate forms of these silicate materials will exhibit pronounced improvement when treated in accordance with the teachings of this invention. Such forms of silicate materials will be designated particulate forms for the purpose of this specification.

Although specific treatments in accordance with the present teaching will now be described, the invention is not to be limited to these specific disclosures. Rather, the specific treatments described illustrate the inventive concept. All percentages recited in the specification and claims are by weight.

A solution of a barium compound applied to freshly formed glass surfaces provides improved dielectric properties and prevents seizure of adjacent glass surfaces. An ionic coating of barium is applied by introducing a dilute solution of barium hydroxide onto the glass surfaces and then allowing the solution to dry on the glass surface. A coating achieved by applying a 0.1 to 0.3% aqueous solution of barium hydroxide to glass fibers will, upon drying, provide adequate barium ions on the surface of the glass to prevent glass to glass and fiber to fiber adhesion. The ion concentration in the treating solutions is maintained low enough to prevent the formation of a gel. The glass surfaces likewise become less sensitive to water adsorption. Since water is not readily adsorbed after the barium ion treatment, the fibers do not lose tensile strength that generally results from exposure to water containing atmospheres. Although it is known that the improved abrasion resistance and tensile strength is a result of a surface improvement by adsorption, it is not known whether the large cations react with constituents of the glass or if they merely are held there by a sorption phenomena. A possible reaction product when treating with a barium compound is barium silicate formed on the glass surfaces.

Weak solutions of various barium salts can be applied to glass surfaces to achieve the placement of barium ions on the glass. Any ionizable compound which can form a dilute solution in water or another suitable solvent may be used. The following barium compounds represent those which can be used as a source of barium: barium borowoframate, barium bromate, barium bromide, barium carbonate, barium chlorate, barium chloride, barium dithionate, barium ferrocyanide, barium fluoride, barium hydroxide, barium hypophosphite, barium iodate, barium iodide, barium manganate, barium molybdate, barium nitrate, barium nitrite, barium permanganate, barium phosphate, barium phosphite, barium selenate, barium sulfide, barium sulfite, barium thiocyanate, barium thiosulfate, barium titanate and barium wolframate.

The barium ions are believed to be adsorbed upon the glass surfaces due to Van der Waal's forces. This surface phenomenon is a physical attachment but nevertheless an effective means of treating glass. Other surface phenomena such as chemical reaction probably occurs with barium ions reacting with constituents of the glass surface. Both chemical and physical attachment or either one may be utilized to achieve the desired results. In time barium silicate is believed to be formed on the glass surface. Such treatments provide hydrophilic surfaces upon flakes or other glass forms which can be suspended in an aqueous media. The barium silicate surface can be readily destroyed by a hydrochloric acid treatment.

Calcium ions are applied from salt solution similarly as are barium ions. Calcium compounds utilized are selected from the following list which does not necessarily include all compounds that may be useful for the purpose of supplying calcium ions to a glass surface: calcium arsenate, calcium arsenite, calcium bisulfite, calcium bromide, calcium chlorate, calcium chloride, calcium chromate, calcium dichromate, calcium ferricyanide, calcium ferrocyanide, calcium hydride, calcium hydroxide, calcium hypophosphite, calcium iodate, calcium iodide, calcium nitrate, calcium nitrite, calcium oxide, calcium perborate, calcium permanganate, calcium peroxide, calcium phosphate, calcium phosphite, calcium sulfate, calcium sulfide, calcium sulfite, calcium thiocyanate, calcium thiosulfate, and calcium titanate.

Calcium hydroxide as a 0.2% solution in water is used to prepare a slurry of glass flake. Sheets of material are then formed by pouring this slurry onto a surface followed by complete removal of the water. The individual flakes are not adhered to one another but instead they are readily dispersible in a phenolic resin. The resin is mold-cured to form a strong, glass-reinforced electrical insulator. Flakes treated with calcium exhibit improved dielectric properties over flakes which have not been so treated.

The treatments can be applied to glass as it is formed as is illustrated in the drawings wherein:

FIGURE 1 is an elevational view of a process for forming continuous glass fibers as a strand;

FIGURE 2 is an elevational view of flake producing apparatus.

Continuous filaments produced with a conventional collet winding apparatus are treated with a solution comprising a suitable ion for adsorption on the glass surfaces, see FIGURE 1. Streams 11 of molten glass are flowed from a feeder 12 provided with a plurality of orifices arranged in individual tips or nipples, not shown. These streams 11 are attenuated into individual fibers by the pulling action of collet winder 13. The fibers are sprayed with a treating solution prepared in accordance with the teachings of this invention and then gathered into a strand 14 as they pass over gathering wheel 15. Spray nozzle 16 applies a dilute solution of a salt or other compound containing a cation or anion which can be deposited and retained on the glass surfaces by adsorption. The strand 14 collected as a package upon a tube on the collet is dried by any suitable means. Strand so formed can be used to produce swirl or chopped mat for reinforcement of plastic or can be twisted and plied into yarn for producing fabric. Nozzles 16 can be installed immediately below feeder 12 so that a fine mist of treating solution is directed onto the fan of fibers being produced. Such placement of the nozzles assures immediate treatment of the glass surfaces as they are formed and prior to contamination by elements in the atmosphere about the forming position. The treating solution can be applied at the roll or pad gathering device along with a size composition.

Flakes of glass are conventionally produced as shown in FIG. 2. A tube 17 of molten glass is flowed from a bushing 18 and attenuated by the action of a pair of pull rolls 19 which partially collapse the cylinder as it is advanced. The tube is re-expanded as it advances to suction rolls 21 whereupon the tube is collapsed and then broken into flakes 22. A solution containing a suitable cation or anion is dispersed in air and introduced into the hollow tube through nozzle 23. Alternatively the treating solution is introduced onto the pull rolls 19 and then transferred to the cylinder of glass.

The treating compositions disclosed provide adsorption of cations upon the glass surface to increase the hydrophobosity, improve wet and dry strengths of resin and glass combinations, and improve the dielectric properties of the glass.

Other silicate materials can be likewise treated. For instance, mica is treated with a less than 1% solution of calcium hydroxide in water. Calcium ions are adsorbed upon the surface of the mica. Low free energy surfaces are formed by such a treatment. Treatment with a dilute solution of a salt of calcium or barium gives an especially pronounced effect when used on freshly cleaved surfaces of mica.

Any silicate material can be advantageously treated in accordance with the teachings of the invention. Silicate materials that can be treated with advantage are mica, glass, quartz, wollastonite, and other silicate structures including those which are described as sheets, chains, closed rings, and three-dimensional frame work structures. These silicate materials may be in any form. Low free energy surfaces are provided by such treatments and the treatments are especially effective with newly formed surfaces since the free energy is that energy which accompanies formation of a new surface. Although the surface energy of rigid silicate materials is not readily subject to direct measurement, it is known that the surface energy existing between the surface of a solid silicate material and its surrounding medium is a factor in its brittleness and in the breaking stress.

Adsorption of calcium, barium or other ions deposited from solution provide the silicate material surface with improved properties including greater hydrophobosity, improved wet and dry strengths, improved dielectric properties, and a reduction of self-adherence. Adjacent surfaces of flakes or sheets or particles of like materials whether they be glass or mica or any of the other silicates tend to adhere strongly to one another and the treatments of this invention make them less self-adhering.

Although sodium or other Group I alkali or alkaline earth metals have been replaced by metallic ions from solution in former treatments such as those of Hyde, see U.S. 2,245,783, these former treatments have depended upon absorption of such ions throughout the glass structure as by base exchange. The present treatment is a surface phenomena only (adsorption) and does not depend upon base exchange. Absorption does not provide the results provided by the present treatments which give results even though no alkali or alkaline earth metal is present in the glass or other silicate surface. Hyde's absorption treatments utilize 5% to 20% salt solutions while the present adsorption treatments utilize a fractional percent solution. The Hyde salt treatments require washing while the present treatments based upon adsorption do not use a washing step as a part of the treatment.

A mixture of ions may be adsorbed on the glass surfaces, for instance, both calcium and barium may be utilized as adsorbed cations. Although only inorganic compounds have been listed above, certain organo-calcium and organo-barium compounds can be used. For instance, calcium thioglycollate can be deposited on the glass surfaces as a water solution. Upon exposure to the atmosphere the compound decomposes leaving calcium carbonate on the silicate surface. The application of a solution makes it possible to apply a small but sufficient amount of calcium carbonate to the silicate surface to achieve non-adherence and greatly improved abrasion resistance. Other compounds that can be used include calcium acetate, calcium benzoate, calcium creosotate, calcium formate, calcium gluconate, calcium methionate, calcium phenolsulfonate, and calcium propionate. Many organo-barium compounds are poisonous and would not be used for this reason; however, the water soluble compounds can be used with precaution as a source of barium ions in solution. Treating a silicate surface with barium or calcium ions results in the formation of barium or calcium silicate. This compound is not so reactive as the original silicate surface and, for this reason, similar silicate surfaces tend to adhere or abrade upon one another; however, if they are treated with calcium or barium ions, the resulting surfaces are improved in that they do not abrade and do not adhere to one another and, for this reason, are improved.

These treatments may be applied to any silicate surface and are preferably applied to freshly formed surfaces of glass, mica or other silicates. Specific processes have been described, however, others may be utilized to produce fibers and flakes; for instance, barium or calcium can be applied to fibers as they are being formed and collected by preparing a solution of an acid salt and applying the solution over the steam blowers of the wool or steam blown fiber forming process. Mica can be treated as the freshly cleaved surfaces are exposed by cleaving the mica while in the solution or by spraying the mica as the fresh surfaces are exposed with a spray of a suitable low concentration salt solution.

Another advantage in treating the silicate surfaces with a suitable cation or cations results from the inability of such a treatment to cross-link with materials with which the treated silicate surface is to be combined or otherwise associated. Furthermore, the presence of large cations such as calcium or barium on the glass surfaces prevents reaction of constituents of the glass or other silicate with resins which these materials are to reinforce. For instance, barium in the form of adsorbed ions on the surface of a boric oxide containing glass will prevent formation of boron trifluoride or other fluorides when the glass is used to reinforce Viton A, a fluoride polymer. If the fluoride formation is not inhibited, the Viton A is cross-linked in the presence of the boron fluoride resulting in embrittlement of the polymer.

Variations may be made within the spirit and scope of the appended claims.

We claim:
1. Process for treating attenuated glass with a Group II cation comprising applying a less than 1% solution of a compound from the group consisting of compounds of barium, calcium, and mixtures of these compounds to the surfaces of the attenuated glass and drying the attenuated glass to deposit on the glass surfaces a sufficient amount of the Group II cation to provide non-seizure and abrasion resistance thereto.
2. The process of claim 1 wherein the solution is one of barium hydroxide.
3. The process of claim 1 wherein the solution is one of calcium hydroxide.
4. Attenuated glass, the surfaces of which are abrasion-resistant and non-seizing due to the presence of a dried deposit of at least one Group II cation from the group consisting of barium, calcium, and mixtures of these cations applied from a less than 1% by weight solution of a compound of the cation.
5. In a process of forming attenuated glass from a melt, the improvement comprising application to the surface of the attenuated glass, of a less than 1% by weight solution of a compound from the group consisting of compounds of calcium, barium and mixtures of these compounds, and drying the solution upon the attenuated glass to provide non-seizure and abrasion resistance thereto.

References Cited by the Examiner
UNITED STATES PATENTS

| | | | |
|---|---|---|---|
| 2,017,318 | 10/1935 | McCoy | 117—123 |
| 2,194,683 | 3/1940 | Badollet | 117—100 |
| 2,233,259 | 2/1941 | Harth | 65—60 X |
| 2,233,433 | 3/1941 | Smith | 117—126 |
| 2,245,783 | 6/1941 | Hyde | 117—126 |
| 2,273,040 | 2/1942 | Iler | 117—100 |
| 2,308,389 | 1/1943 | Lawrence | 117—100 |
| 2,315,259 | 3/1943 | Hyde | 117—126 |
| 2,356,542 | 8/1944 | Sloan | 117—126 |
| 2,457,785 | 12/1948 | Slayter et al. | 154—2.6 |
| 2,546,701 | 3/1951 | Ransberg et al. | 118—631 |
| 2,576,952 | 12/1951 | Lowe et al. | 117—100 |
| 2,680,696 | 6/1954 | Broge | 117—100 |
| 2,699,415 | 1/1955 | Nachtman | 117—126 |
| 2,703,549 | 3/1955 | Ransberg et al. | 118—631 |
| 2,716,618 | 8/1955 | Stenzel | 117—126 |
| 2,754,224 | 7/1956 | Caroselli | 117—100 |
| 2,839,424 | 6/1958 | Labino | 117—126 |
| 2,842,183 | 7/1958 | Gaines | 117—123 |
| 3,003,911 | 10/1961 | Lindstrom et al. | 117—100 |
| 3,006,805 | 10/1961 | Waggoner | 162—145 X |
| 3,012,929 | 12/1961 | Jackson | 162—145 |
| 3,047,409 | 7/1962 | Slayter et al. | 117—100 |
| 3,066,065 | 11/1962 | Koerner et al. | 154—2.6 X |

RICHARD D. NEVIUS, *Primary Examiner.*